Figure 1:
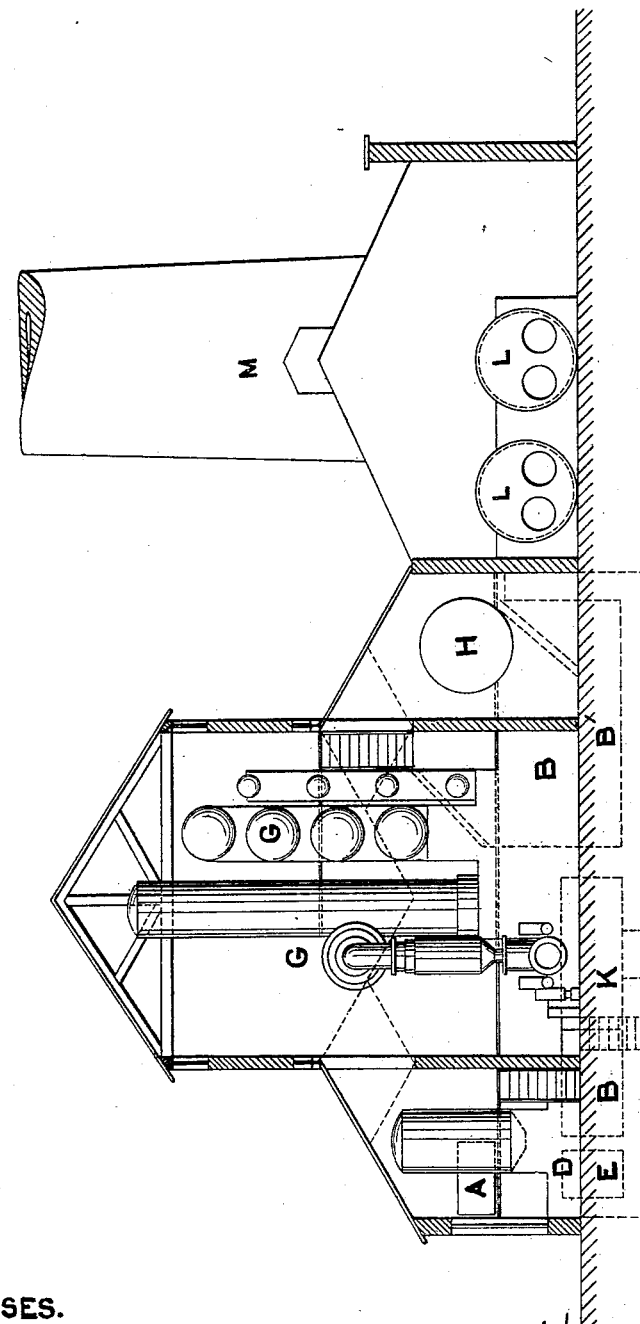

No. 632,419. Patented Sept. 5, 1899.
W. LEACH.
PURIFYING LIQUORS FROM WOOL WASHINGS.
(Application filed Feb. 1, 1899.)

(No Model.) 3 Sheets—Sheet 1.

WITNESSES.
R. Ovendale.
M. Holyoak

INVENTOR
Walter Leach
by Owden O'Brien
atty.

No. 632,419. Patented Sept. 5, 1899.
W. LEACH.
PURIFYING LIQUORS FROM WOOL WASHINGS.
(Application filed Feb. 1, 1899.)
(No Model.) 3 Sheets—Sheet 2.
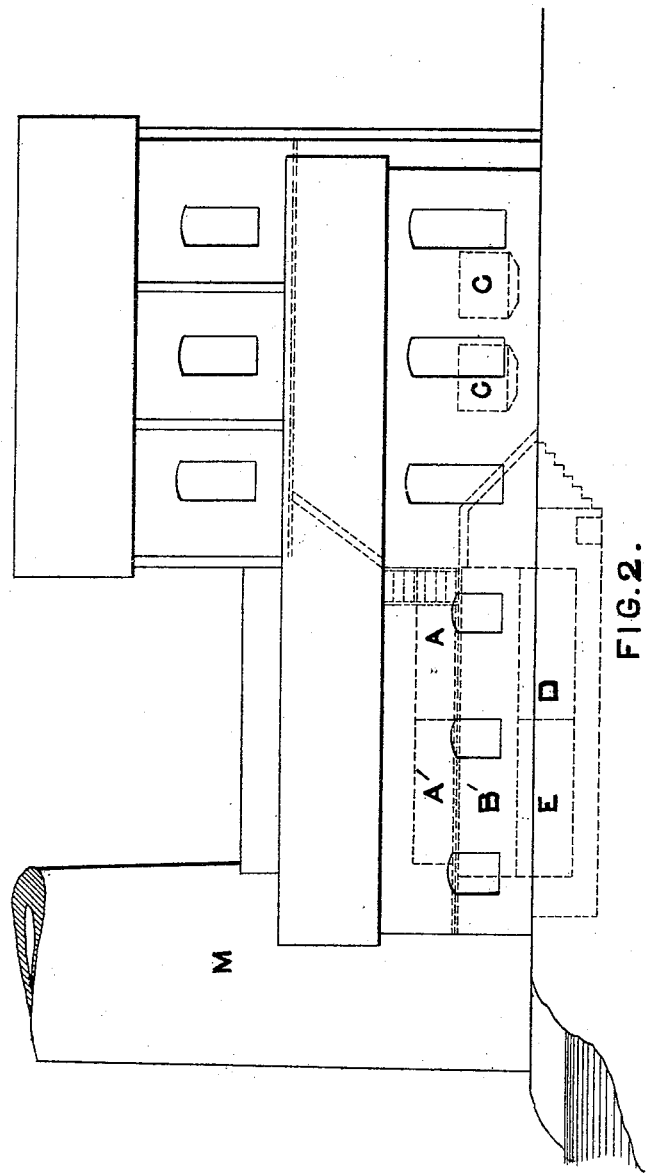
WITNESSES.
INVENTOR
Walter Leach No. 632,419. Patented Sept. 5, 1899.
W. LEACH.
PURIFYING LIQUORS FROM WOOL WASHINGS.
(Application filed Feb. 1, 1899.)
(No Model.) 3 Sheets—Sheet 3.
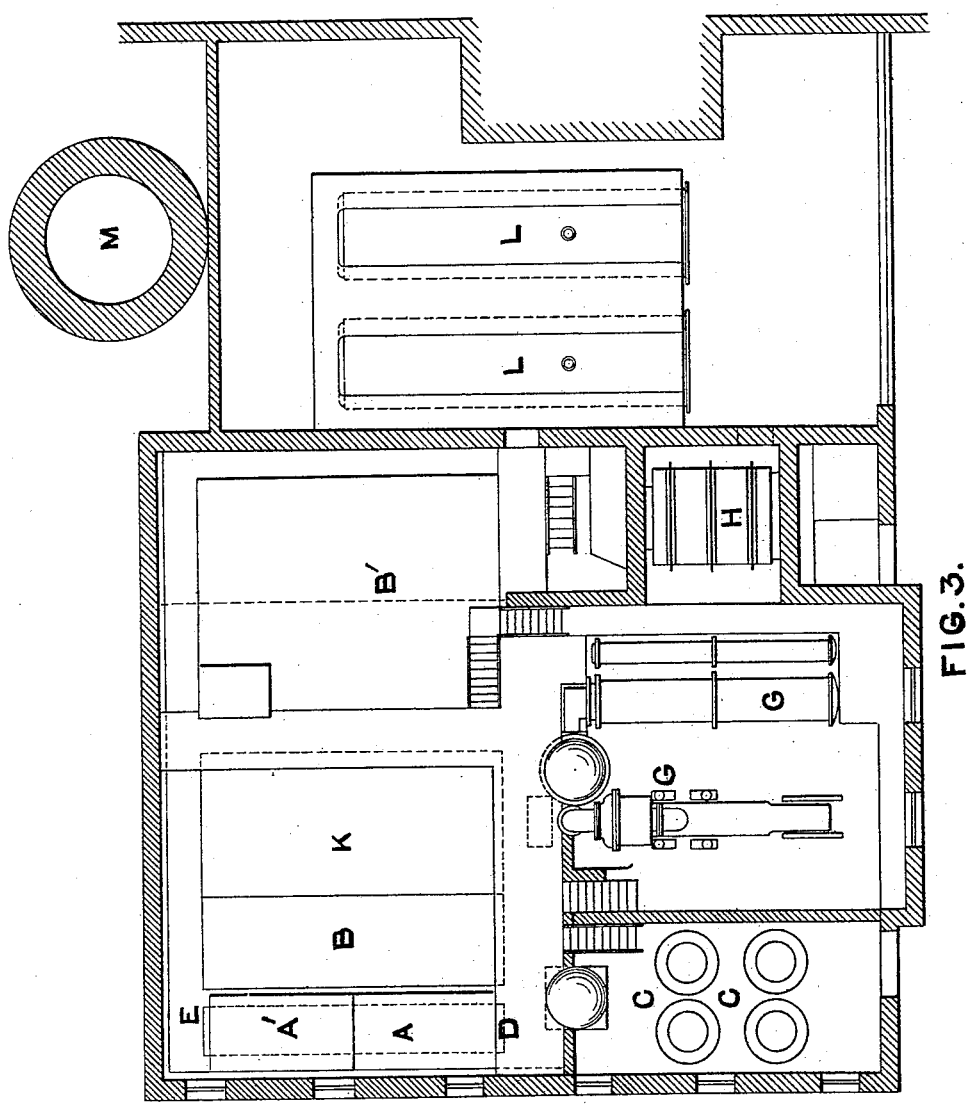
WITNESSES.
R. Ovendale.
M. Holyoak.
INVENTOR
Walter Leach
by O'Wawo O'Brien
atty.

UNITED STATES PATENT OFFICE.

WALTER LEACH, OF BRADFORD, ENGLAND, ASSIGNOR OF THREE-FOURTHS TO THE JOHN SMITH & SONS, LIMITED, OF SAME PLACE.

PURIFYING LIQUORS FROM WOOL-WASHINGS.

SPECIFICATION forming part of Letters Patent No. 632,419, dated September 5, 1899.

Application filed February 1, 1899. Serial No. 704,029. (No specimens.)

*To all whom it may concern:*

Be it known that I, WALTER LEACH, a subject of the Queen of Great Britain, residing at Bradford, in the county of York, England, have invented certain new and useful Improvements in the Treatment of Wash Liquors from Wool and other Animal Fiber to Recover the Grease and Potash Therefrom, of which the following is a specification.

Wool and other animal fibers—such as alpaca, mohair, and the like—are washed or treated with soap and alkali in water to remove the grease and potash therefrom, and by the processes hitherto adopted it has been found difficult or impossible to recover or separate all the grease from the wash liquors and the greasy effluents have been difficult to purify or dispose of and are objectionable when run into sewers or drains. By this invention the potash and grease washed out of the wool and the alkali and soap employed for the purpose can be effectually separated and recovered from the wash liquors, leaving a residue or effluent of clean water available afterward for washing purposes, the separated materials being utilized as valuable by-products.

It consists, essentially, in concentrating the wash liquors or soap solution, known as "sud" liquor, from the washbowl to increase its density until there is a considerable difference in density between the fatty matter—i. e., wool-grease—and soapy potash solution, and then separating the denser part of the liquid or solution from the lighter in a centrifugal machine, and finally purifying the separated liquids to obtain lanolin from one and potash from the other.

The invention will be fully described with reference to the accompanying drawings, which illustrate a plant suitably constructed and arranged for the purpose of carrying it out, though it is to be understood that the invention may be carried out by any apparatus that may be found to be suitable therefor.

Figure 1 is a longitudinal sectional elevation. Fig. 2 is a side elevation. Fig. 3 is a sectional plan.

In carrying out the invention I prefer to dispense with any preliminary washing or steeping of the wool in water.

The wool, (or other animal fiber,) preferably in its raw or crude state, is washed in an alkaline solution with soap in the usual way. After this washing the liquor contains the natural fat and potash that were adhering to the wool, and it is this wash liquor that is treated by this invention to separate and recover therefrom the lanolin, potash, and other substances contained therein, leaving the water clean and suitable for reuse. I find by concentrating the wash liquor—reducing it to about one-tenth to one-twentieth of its former volume—that the difference in density between the fatty matter or lanolin contained therein and the potash solution renders the two capable of separation by mechanical means, the density then being about specific gravity of 916 for the fatty matter and about specific gravity 1,350 for the alkaline solution. The wash or sud liquor is concentrated by boiling in any suitable concentrator or evaporator G until reduced to the required volume and density and is then run into a tank or holder A. The steam or water evaporated off is preferably collected for reuse in washing in a tank or cistern B. The liquor from the tank or holder A (which serves as a supply-tank) is run into centrifugal separators C, wherein the lighter material is separated from the heavier, the fat or fatty matter being practically all separated from the other liquor. The fat thus separated is practically all lanolin and the other liquor a solution of potash, which runs from the separators to the tanks or holders D and E, respectively. The separated fatty matter is purified by any ordinary or well-known means, rendering a lanolin or wool-fat of good quality free from fatty acids for use either for pharmaceutical, manufacturing, or domestic purposes. The effluent potash liquor from the tank or holder E is then run into and treated in a "yaryan" or suitable concentrator or evaporator G and the water is evaporated off until it is concentrated to a thick, syrupy, or pasty consistency, which is delivered into tank A'. The condensed or distilled water is collected in the tank B for reuse.

The concentrator G is employed for concentrating the sud or wash liquor and subsequently for concentrating the potash solution after separation of the fat. The concentrated product is placed in a rotary or other calcining furnace H, in which it is heated or calcined to remove organic impurities, leaving a residual product of potash. This is collected and may be further purified by a process of crystallization or otherwise.

The insoluble impurities, sand, &c., may be allowed to settle from the liquor prior to concentration; but I prefer to pass the whole of the said liquor, with the sand and insoluble impurities, into the concentrator and to remove them in the centrifugal machine, in which, being denser than the fat and potash solution, they are driven to the outside under centrifugal action and can be removed therefrom by mechanical means.

Although I prefer to wash the wool in its original raw state, it may be first steeped or washed with pure water to remove the potash and solid matter and then subsequently washed with soap, the soap liquor being treated as above described to purify it and recover the lanolin therefrom.

The water distilled off during concentration is collected in the tank B and used for further washing.

B' is a tank for water.

K is a storage-tank for the wash liquors prior to concentration, and L L are steam-boilers, the flues of which communicate with the chimney M.

What I claim as my invention, and desire to protect by Letters Patent, is—

1. The combined process of purifying and recovering valuable products from the wash liquors from wool and other animal fibers which consists in concentrating the wash liquor, to increase the density thereof and render the fatty matter capable of mechanically separating from the solution, and separating the concentrated fat and potash liquor in a mechanical centrifugal machine, substantially as described.

2. The combined process of purifying and recovering valuable products from the wash liquors from wool and other animal fibers which consists in concentrating the wash liquor to a density to render the fatty matter capable of being separated by mechanical means, separating the fat and the alkaline liquor mechanically in a centrifugal machine, purifying the fat obtained therefrom and further concentrating the liquor to a pasty consistency and then calcining it to remove organic matter substantially as described.

In witness whereof I have hereunto signed my name, in the presence of two subscribing witnesses, this 19th day of January, 1899.

WALTER LEACH.

Witnesses:
JNO. HENRY WADE,
H. O. WADE.